US011222779B2

(12) United States Patent
Dada

(10) Patent No.: US 11,222,779 B2
(45) Date of Patent: Jan. 11, 2022

(54) APPARATUSES FOR OPTICAL AND MASS SPECTROMETRY DETECTION

(71) Applicant: GMJ Technologies, Inc., Everett, WA (US)

(72) Inventor: Oluwatosin O. Dada, Everett, WA (US)

(73) Assignee: GMJ Technologies, Inc., Everett, WA (US)

( * ) Notice: Subject to any disclaimer, the term of this patent is extended or adjusted under 35 U.S.C. 154(b) by 0 days.

(21) Appl. No.: 17/053,291

(22) PCT Filed: May 16, 2019

(86) PCT No.: PCT/US2019/032712
§ 371 (c)(1),
(2) Date: Nov. 5, 2020

(87) PCT Pub. No.: WO2019/222531
PCT Pub. Date: Nov. 21, 2019

(65) Prior Publication Data
US 2021/0104392 A1    Apr. 8, 2021

Related U.S. Application Data

(60) Provisional application No. 62/672,955, filed on May 17, 2018.

(51) Int. Cl.
*H01J 49/16*    (2006.01)
*G01N 27/447*    (2006.01)
(Continued)

(52) U.S. Cl.
CPC ...... *H01J 49/167* (2013.01); *G01N 27/44721* (2013.01); *H01J 49/022* (2013.01); *H01J 49/025* (2013.01); *H01J 49/067* (2013.01)

(58) Field of Classification Search
CPC ...... H01J 49/022; H01J 49/025; H01J 49/067; H01J 49/165; H01J 49/167; G01N 27/26; G01N 27/447
See application file for complete search history.

(56) References Cited

U.S. PATENT DOCUMENTS 4,994,165 A * 2/1991 Lee ............... G01N 27/44717
204/453
5,439,578 A * 8/1995 Dovichi ........... G01N 27/44721
204/603
(Continued)

FOREIGN PATENT DOCUMENTS

WO    2017027838 A1    2/2017

OTHER PUBLICATIONS

PCT/US2019/032712 Jul. 26, 2019 Internatinal Search Report.
(Continued)

*Primary Examiner* — David E Smith
(74) *Attorney, Agent, or Firm* — Rowan TELS LLC

(57) ABSTRACT

Presented herein are apparatuses for use in capillary separations. An apparatus includes a coupling that integrates a capillary with a voltage source, a sheath liquid system, a fluid exit port, and a manifold. The coupling may be an elbow connector or equivalent. The manifold receives incident light from an incident light input, and emitted light is collected by a collected light output. The capillary enters the manifold at an input for the capillary, traverses the coupling, and terminates at the fluid exit port, for example an electrospray emitter. The capillary may also enter the manifold at an input for the capillary and terminates inside the manifold.

20 Claims, 13 Drawing Sheets

(51) Int. Cl.
 *H01J 49/02* (2006.01)
 *H01J 49/06* (2006.01)

(56) References Cited

U.S. PATENT DOCUMENTS

| | | |
|---|---|---|
| 5,741,412 A | 4/1998 | Dovichi et al. |
| 5,917,184 A * | 6/1999 | Carson .................. H01J 49/044 |
| | | 250/288 |
| 9,927,396 B2 * | 3/2018 | Peterson .......... G01N 27/44743 |
| 2014/0151550 A1 * | 6/2014 | Hiraoka ................. G01N 27/68 |
| | | 250/288 |

OTHER PUBLICATIONS

PCT/US2019/032712 Jul. 26, 2019 Written Opinion of the International Searching Authority.

Title "Laser-induced fluorescence detector with a fiber-coupled micro GRIN lens for capillary electrophoresis", author Oluwatosin O. Dada. Published May 27, 2020.

* cited by examiner

US 11,222,779 B2

APPARATUSES FOR OPTICAL AND MASS SPECTROMETRY DETECTION

CROSS-REFERENCE TO RELATED APPLICATIONS

This application claims priority and benefit as a National Stage Application under 35 U.S.C. 371 to International Patent Application serial no. PCT/US2019/032712, filed on May 16, 2019, which claims the benefit under 35 USC 119(e) to U.S. Application Ser. No. 62/672,955, filed on May 17, 2018, each of which is incorporated herein by reference in their entirety.

BACKGROUND

Advancements in ionization interfaces for coupling capillary electrophoresis (CE) with electrospray ionization (ESI) mass spectrometry (MS) have enabled applications of CE-ESI-MS for various chemical and biochemical analyses. Existing CE-ESI-MS uses electrospray interfaces that can be broadly categorized as either sheath flow (U.S. Pat. Nos. 5,993,633; 9,465,014; 9,234,880; and 8,613,845) or sheathless (U.S. Pat. Nos. 9,927,396; 8,754,370; 6,863,790; 10,121,645; and 5,505,832).

Sheath flow interfaces typically utilize a coaxial sheath liquid to provide electrical contact for the electrophoretic separation, modify the separation medium to be more MS compatible, and generate electrospray for MS detection. The original sheath flow interface was developed by Smith's group and was commercialized in the 1990s (U.S. Pat. No. 5,993,633). Since then other versions of sheath flow interface have been developed. Notably, Dovichi's group developed a sheath flow interface that uses electroosmotic nano-flow to drive the electrospray (U.S. Pat. Nos. 9,465,014 and 9,234,880). In that design, the spray emitter is a borosilicate glass pulled at the distal end to create a micro nozzle, typically with 10-30 mm inner diameter. The separation capillary is inserted into the emitter filled with an MS compatible sheath liquid supplied from the sheath liquid reservoir through a fluidic connector. The ESI voltage driving the electroosmotic flow inside the emitter is delivered to the sheath liquid reservoir. While this configuration has been shown to provide good sensitivity for multiple analytes the design still has some problems. The tapering process renders the emitter's wall at the outlet very fragile. Because the taper length has to be long, typically more than 5 mm, to be able to form a less than 50 mm orifice, the narrow cone angle hinders the separation capillary outlet to be positioned at the closest distance from the emitter outlet. The emitter tip is often fractured when the separation capillary bumps against the tip during insertion. The fragile tip is also susceptible to dielectric breakdown when operated under high voltage continuously for several days, which can limit its shelf life.

Another notable version of sheath flow interface was developed by Chen's group (U.S. Pat. No. 8,613,845). That design uses a stainless steel hollow needle with a bevel tip. The needle acts as an electrode for CE outlet and an spray emitter for MS. Although the steel needle interface is more rugged than tapered glass interfaces, the design typical is used with the electrospray voltage delivered directly, which often leads to bubble formation and corona discharge due to redox reaction on the metal surface. This usually limits the electrospray performance. Also metal emitters can only use mechanical pump-driven flow to maintain a stable electrospray. This requirement creates higher flow rate than the electrokinetically pumped interface described above, which then limits its sensitivity owing to higher dilution of the analyte by the sheath liquid.

In sheathless interface designs, the separation capillary commonly serves as the emitter which eliminates sample dilution associated with sheath flow interfaces. A notable design was developed by Moini's group (U.S. Pat. No. 6,863,790) and was recently commercialized. The interface used a porous capillary to provide electrical contact to the separation buffer without the introduction of a sheath liquid. The distal end of the separation capillary is etched to a thin porous thickness, sufficiently thin to be conductive. It is placed within a metal sleeve needle filled with a conductive liquid. ESI voltage is then applied to the metal needle to drive electrospray at the capillary tip. Though the interface provides better sensitivity over sheath flow interfaces, the etched capillary is extremely fragile. Under high voltage, deterioration of the porous tip leads to degraded electrospray and decreased sensitivity. Another major drawback is insufficient flow to drive electrospray when performing separation with negligible or reversed electro-osmotic flow. The electrophoresis buffer is also the electrospray liquid, which limits the allowable separation conditions.

Due to the electrospray ionization efficiency dependent of MS detection, quantitation in CE-ESI-MS can benefit from coupling optical detection with the electrospray interface. A few attempts have been made so far to achieve this with marginal success. However, integrating optical detection CE-ESI-MS is still a challenge due to the complexity of integrating relatively large optical components with electrospray interface.

Apparatus disclosed herein further advance the field of CE-MS technology. A novel optical-electrospray (OptoESI) interface is disclosed for simultaneous optical and mass spectrometry detection in capillary electrophoresis. The interface integrates a micro optical detection scheme with a robust spray emitter that is not easily fractured.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The invention claimed herein addresses multiple technical problems that have hindered the use of CE-MS for routine applications. A sheath flow electrospray interface is disclosed using internal tapering to improve the robustness and shelf life of the emitter tip. The disclosed spray emitter has an external surface coating which further increases the emitter's strength. Also, an apparatus is disclosed for in-line optical detections, such as laser-induced fluorescence, Raman detection, and ultraviolet (UV) detection with or without MS detection in nanoflow liquid separations.

An apparatus for providing optical detection and electrospray, simultaneously, in capillary separation is presented. The optical and the electrospray integration is referred to as an "OptoESI interface". As noted above, existing CE-ESI-MS interfaces do not have optical detection capability directly integrated on the interface. Integrating optical detection capability with the ESI interface is a significant advancement in the field of CE-MS. The interface is comprised of an internally tapered (e.g., glass) emitter coupled with an optical detection window located before the emitter tip. The disclosed configuration enables the optical window to be located at about 1-10 cm, typically 5% of the capillary length, before the ESI emitter. The optical and the ESI mechanisms are integrated as a unitary device, which places the two detections in close proximity and significantly reduces possible mismatch between the optical and ESI profiles.

In some embodiments, the electrospray interface is configured without the optical module. In some embodiments, the optical module is configured without the electrospray interface.

The disclosed embodiments may also, for example, be utilized as a nanospray interface for nanoflow liquid separation techniques such as nanoflow chromatography, etc. Applications also include flow cytometry, medical devices, and forensic tools, for example.

Figure 1:
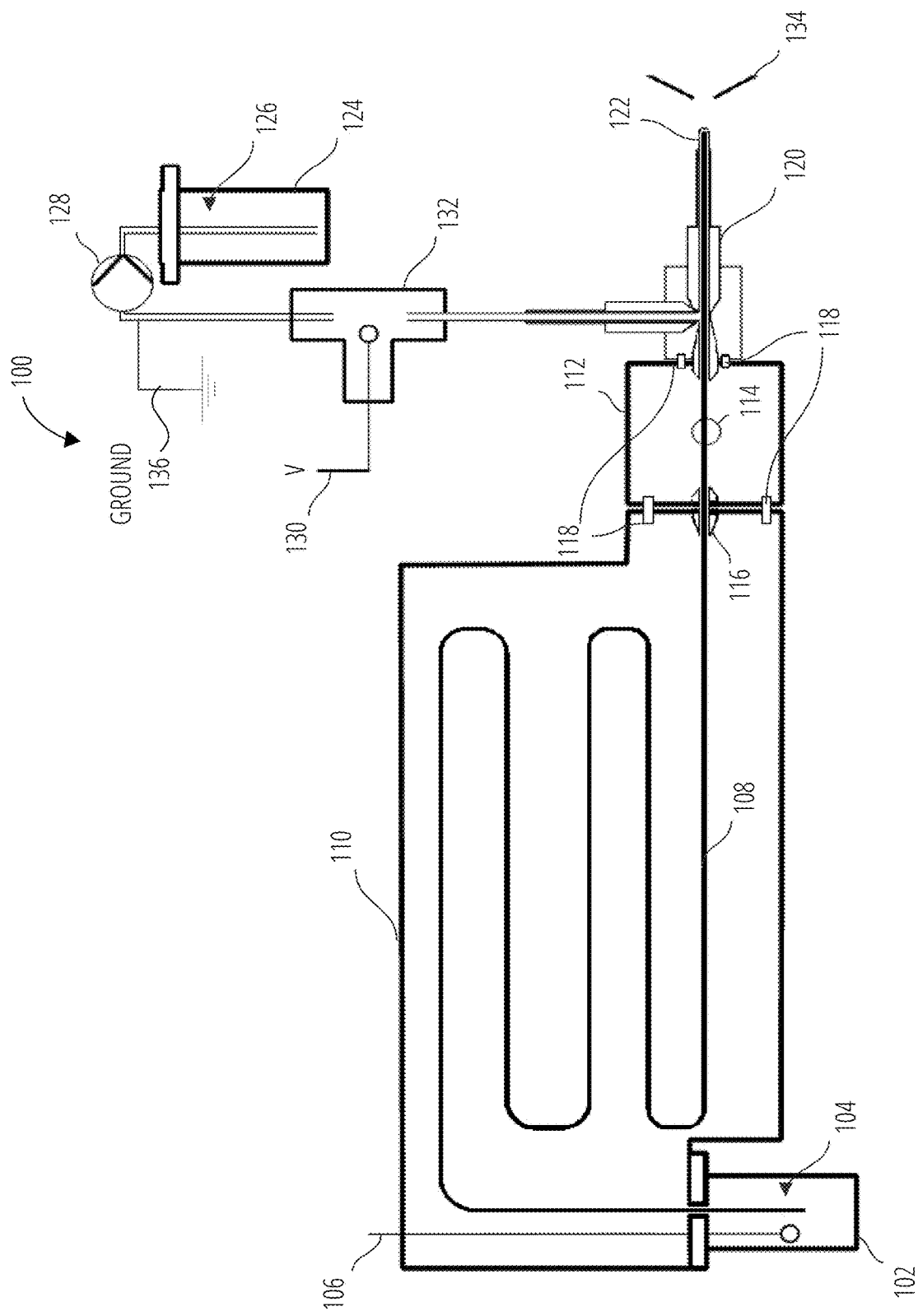
FIG. 1 illustrates an apparatus 100 in accordance with one embodiment, including configured a capillary, separation voltage source, separation liquid reservoir, optical manifold, electrospray interface, sheath liquid reservoir, sheath liquid pump, electrospray voltage junction, and electrospray voltage source.

Referring to FIG. 1, an apparatus 100 comprises a separation liquid reservoir 102, a liquid 104, a separation voltage source 106, a capillary 108, a capillary cartridge 110, an optical manifold 112, an optical window 114, a capillary coupling 116, fasteners 118, an elbow connector 120, a spray emitter 122, an electrospray liquid reservoir 124, an electrospray liquid 126, a pump 128, an electrospray voltage source 130, an electrospray voltage junction 132, and an electrospray 134. The capillary 108, the separation voltage source 106, the spray emitter 122, and the optical manifold 112 integrate to form a coupling. The coupling may further include the elbow connector 120.

The separation liquid reservoir 102 is a container (e.g., vial) to store the separate or analyte liquid 104. The separation liquid reservoir 102 may be removably attached to the capillary cartridge 110. The separation liquid reservoir 102 may have multiple orifices. The capillary 108 may extend into the separation liquid reservoir 102 via an orifice to inject the liquid 104 to be tested by the optical window 114, a mass spectrometer, or other mechanism, into the capillary. Further the separation voltage source 106 (or a contact lead coupled to the separation voltage source 106) may extend into the separation liquid reservoir 102 and contact the liquid 104 via another orifice. In one embodiment, the same orifice is utilized for both the separation voltage source 106 and the capillary 108.

The liquid 104 is stored in the separation liquid reservoir 102. Upon receiving a separation voltage from the separation voltage source 106, the liquid 104 is driven into the capillary 108, or may be pneumatically pumped via a pump line (not depicted). The liquid 104 is sent to the spray emitter 122 where it is combined with the electrospray liquid 126 prior to being emitted as the electrospray 134. The liquid 104 is the liquid to be tested by the optical window 114, the mass spectrometer, etc., and may thus differ in each embodied setup of the apparatus 100. The liquid 104 may include liquids utilized for chemical, bioanalytical, pharmaceutical, environmental, and forensic application. In one embodiment, the liquid 104 comprises amino acids, proteins, and/or peptides. Further, the liquid 104 may be chemical reagents, bioreagents, blood, or urine.

The separation voltage source 106 provides a separation voltage to the liquid 104 stored in the separation liquid reservoir 102. The separation voltage source 106 may be external to the separation liquid reservoir 102 and have a lead that extends into the separation liquid reservoir 102 to contact the liquid 104. The separation voltage applied by the separation voltage source 106 provides the voltage gradient across the capillary 108 that urges the liquid 104 through the capillary 108 to the spray emitter 122 for discharge into the mass spectrometer (for example).

The capillary 108 is a narrow tube (e.g., about 50 µm in diameter) utilized to transfer the liquid 104 from the separation liquid reservoir 102 to the spray emitter 122 for subsequent discharge. The liquid 104 is further driven into the capillary 108 by the application of the separation voltage from the separation voltage source 106. The capillary 108 may have a varied total length. The length may be extended by utilizing a larger capillary cartridge 110 and having the capillary 108 traverse a non-linear path (one embodiment depicted in FIG. 1). The capillary 108 may be oriented orthogonal to the optical window 114 wherein the liquid 104 undergoes optical detection when the optical detectors are operating. The capillary 108 may then end in the spray emitter 122. The capillary 108 may define an annulus with elbow connector 120 and/or the spray emitter 122. Within this annulus, the electrospray liquid 126 may flow prior to being mixed with the liquid 104 in the spray emitter 122. The capillary 108 may be constructed from a transparent material (e.g., glass) to enable optical detection.

The capillary cartridge 110 is a generally a structure (e.g., hollow tubular) to house the capillary 108 (see the example in FIG. 1) between the separation liquid reservoir 102 and the optical manifold 112. The capillary cartridge 110 may be sized to enable various, adjustable lengths for the capillary 108. The capillary cartridge 110 may have internal structures to hold the capillary 108 to reduce the likelihood of damaging the capillary 108. The capillary cartridge 110 may be a rigid or flexible material, for example thermoset plastic (e.g., polyurethanes, polyesters, epoxy resins, and phenolic resins).

The optical manifold 112 is attached to the capillary cartridge 110 and the elbow connector 120. The optical manifold 112 may be attached to the capillary cartridge 110 and the elbow connector 120 by the fasteners 118. The optical manifold 112 may be attached to the capillary cartridge 110 by a capillary coupling 116 (e.g., a rubber septum) where the capillary 108 enters into the optical manifold 112. The optical manifold 112 may be attached to the elbow connector 120 by a microtight fitting. Such a fitting inhibits the flow of the electrospray liquid 126 into the optical manifold 112. The optical manifold 112 may be embodied in various shapes, including those that are substantially elliptical or substantially rectangular in profile (depicted in FIG. 3 and FIG. 4, respectively). The optical manifold 112 may have the optical window 114 through which the optical detection occurs. Further, an optical module may be embedded within the optical manifold 112. The optical module may be configured for UV detection, infrared detection, laser-induced fluorescence (LIF) detection, thermo-optical detection, scattering, and/or Raman detection and may include micro gradient-index (GRIN) lenses. These optical detection modules may be selectively operated (e.g., turned on, turned off, disconnected, etc.) The optical manifold 112 orients the optical module with the capillary 108. For example, the optical module may be oriented orthogonal to the capillary 108. The optical manifold 112 may be a rigid structure to inhibit movement of the optical components and the capillary 108 relative to each other. The optical manifold 112 may comprise a thermoplastic polymer, such as polyether ether ketone (PEEK).

The optical window 114 aligns the optical module with the capillary 108. The optical window 114 may be configured at a position from the outlet of the spray emitter 122. Positions closer to the outlet of the spray emitter 122 will minimize differences in the optical and MS profiles. The optical window 114 may be an inline optical window to enable orthogonal sensitive detection with MS detection in nanoflow liquid separations.

The capillary coupling 116 is a fitting for the capillary 108 to enter the optical manifold 112. The capillary coupling 116 may be microtight, that is, designed for microfluidic applications. The capillary coupling 116 may also help couple the capillary cartridge 110 to the optical manifold 112. The capillary coupling 116 may be a septum-type connector. The capillary 108 may be held internal to the septum-type connector. The septum-type connector may then be embedded in the optical manifold 112. The capillary coupling 116 may provide a microtight fitting. Further, the capillary coupling 116 may be constructed of rubber, other elastomer, or plastic.

The fasteners 118 couple the capillary cartridge 110 to the optical manifold 112 and couple the optical manifold 112 to the elbow connector 120. The fasteners 118 may be a screw-type fastener.

The elbow connector 120 receives the capillary 108 from the optical manifold 112. The elbow connector 120 may be enclosed in a rigid housing, which may then be utilized to fasten to the optical manifold 112. The elbow connector 120 may receive the capillary 108 at a microtight fitting, that is, designed for microfluid applications. Such a fitting may inhibit the electrospray liquid 126 from entering the optical manifold 112. The elbow connector 120 further receives a tube that supplies the electrospray liquid 126. The elbow connector 120 forms the annulus with the capillary 108 into which the electrospray liquid 126 may flow. The elbow connector 120 is further coupled to the spray emitter 122.

The spray emitter 122 couples to the elbow connector 120 for example using a microtight fitting and further houses the capillary 108. The spray emitter 122 and the capillary 108 may continue the annulus formed by the capillary 108 and the elbow connector 120. The electrospray liquid 126 flows in the annulus. The capillary 108 ends at a position with the spray emitter 122. At this position, the liquid 104 and the electrospray liquid 126 may mix prior to being discharged as the electrospray 134. The position at which the capillary 108 ends may vary in different embodiments. A position closer to the elbow connector 120 may result in increased mixing of the liquid 104 with the electrospray liquid 126. A position closer to the tip of the nozzle may reduce dilution of the capillary effluent in the subsequent MS reading of the electrospray 134. The spray emitter 122 may be comprised of glass, quartz, ceramic, crystal, etc.

Figure 11:
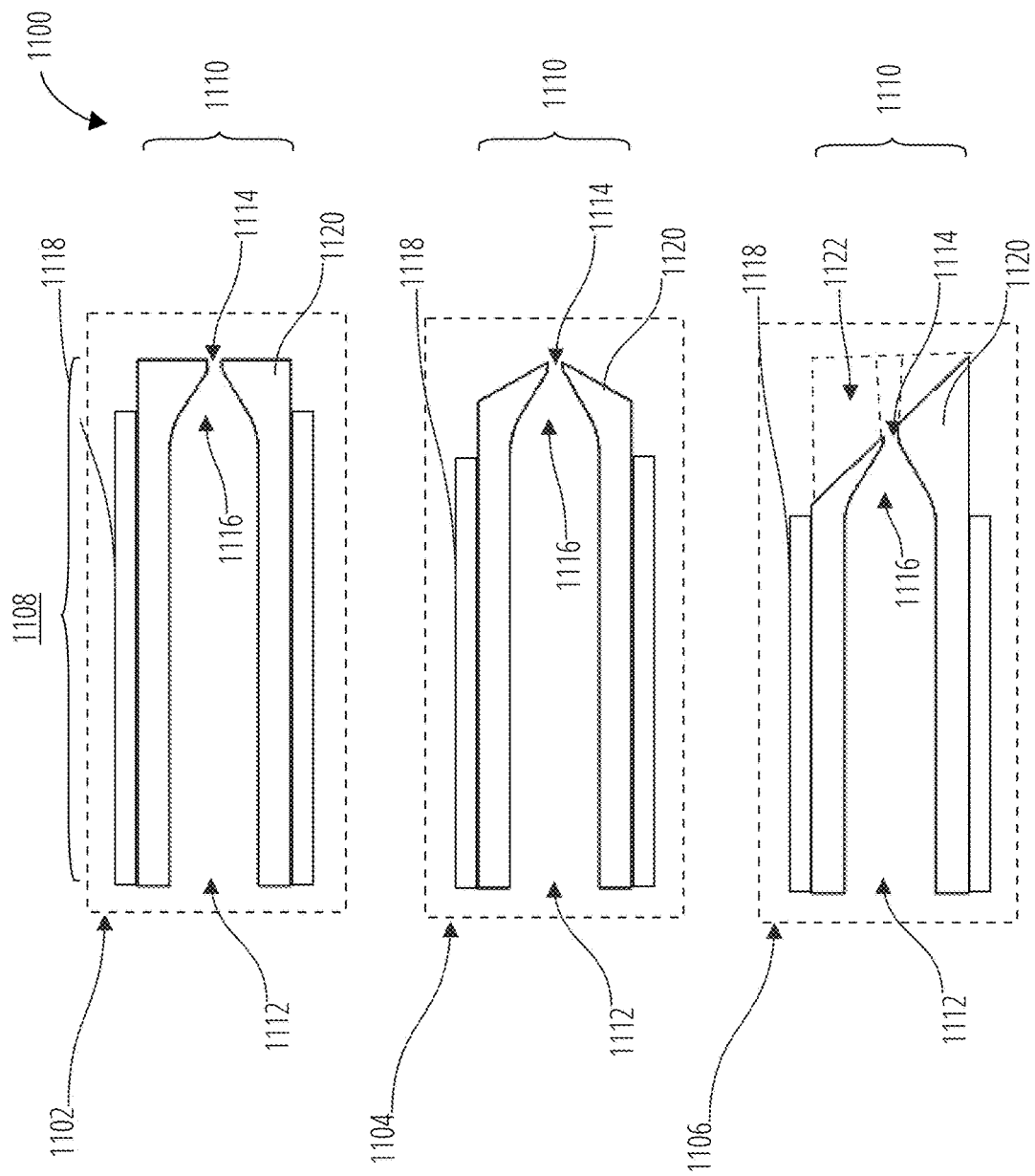
FIG. 11 illustrates internally tapered spray emitters 1100 in accordance with one embodiment.

The spray emitter 122 is configured such that its internal diameter at the distal end is tapered. The distal end of the spray emitter 122 may have flat-, cone-, chamfer-, or wedge-shaped tip. FIG. 11 depicts exemplary embodiments of the spray emitter 122. The external surface of the spray emitter may be coated with polymer (e.g., polyimide coating).

The electrospray liquid reservoir 124 is a container to store the electrospray liquid 126. The electrospray liquid reservoir 124 may be removably coupled to the electrospray voltage junction 132 via tubing or other fluid flow-enabling component. The electrospray liquid 126 and the pump 128 may be electrically isolated via an electrical ground 136. The tubing or other fluid flow-enabling component may be comprised of a material such as a synthetic fluoropolymer of tetrafluoroethylene including polytetrafluoroethylene (PTFE). The electrospray liquid reservoir 124 may have an orifice into which the tubing enters the electrospray voltage junction 132.

The electrospray liquid 126 is a liquid stored in the electrospray liquid reservoir 124. Upon receiving a pressure gradient from the pump 128, the electrospray liquid 126 is driven past the electrospray voltage junction 132 into the elbow connector 120 via tubing or other fluid flow-enabling component. The electrospray liquid 126 may flow in the annulus formed first by the elbow connector 120 and the capillary 108 and then by the spray emitter 122 and the capillary 108. During electrophoretic separation, the electrospray liquid 126 combines with the separation liquid 104 in the spray emitter 122 prior to being discharged as the electrospray 134. The electrospray liquid 126 may be a solvent, such as a mixture of water, organic acid, and volatile organic compounds. The organic acid may be acetic acid, formic acid, etc. The volatile organic compounds may be methanol, acetonitrile, etc.

The pump 128 helps moves the electrospray liquid 126 from the electrospray liquid reservoir 124 past the electrospray voltage junction to the elbow connector 120 and the spray emitter 122 by applying a pressure differential to the electrospray liquid 126 utilizing mechanical action.

The electrospray voltage source 130 provides the electrospray voltage to the electrospray liquid 126 line. The electrospray voltage source 130 may be applied in a housing separate from the electrospray liquid reservoir 124 (e.g., the electrospray voltage junction 132) and have a lead that extends into the electrospray voltage junction 132 to contact the electrospray liquid 126. The electrospray voltage source 130 may provide a high voltage. The electrospray voltage applied by the electrospray voltage source 130 drives the electrospray at the spray emitter 122. The electrospray 134 generated at the spray emitter 122 may be driven by the flow from the gradient pressure between the electrospray liquid reservoir 124 generated from the pump 128 and/or electrokinetic flow from the voltage gradient between the electrospray voltage junction 132 and the spray emitter 122.

The electrospray voltage junction 132 may be coupled to the electrospray liquid reservoir 124 and the elbow connector 120 via tubing or other fluid flow-enabling components. The electrospray voltage junction 132 may receive the electrospray liquid 126. The electrospray voltage junction 132 may also be coupled to the electrospray voltage source 130. A lead from the electrospray voltage source 130 may extend into the electrospray voltage junction 132 to provide the electrospray voltage to the electrospray liquid 126 line.

In embodiments in which a separation voltage source 106 is applied to the separation liquid 104 to form a potential gradient between the capillary 108 inlet and outlet, the electrospray 134 is a mixture of the separation liquid 104 and electrospray liquid 126, and is driven by combination of separation voltage source 106 and the electrospray voltage source 136. The shape of the tip of the spray emitter 122 may alter the shape, droplet size, etc., of the electrospray 134. The electrospray 134 may then be detected by a MS component.

Figure 2:
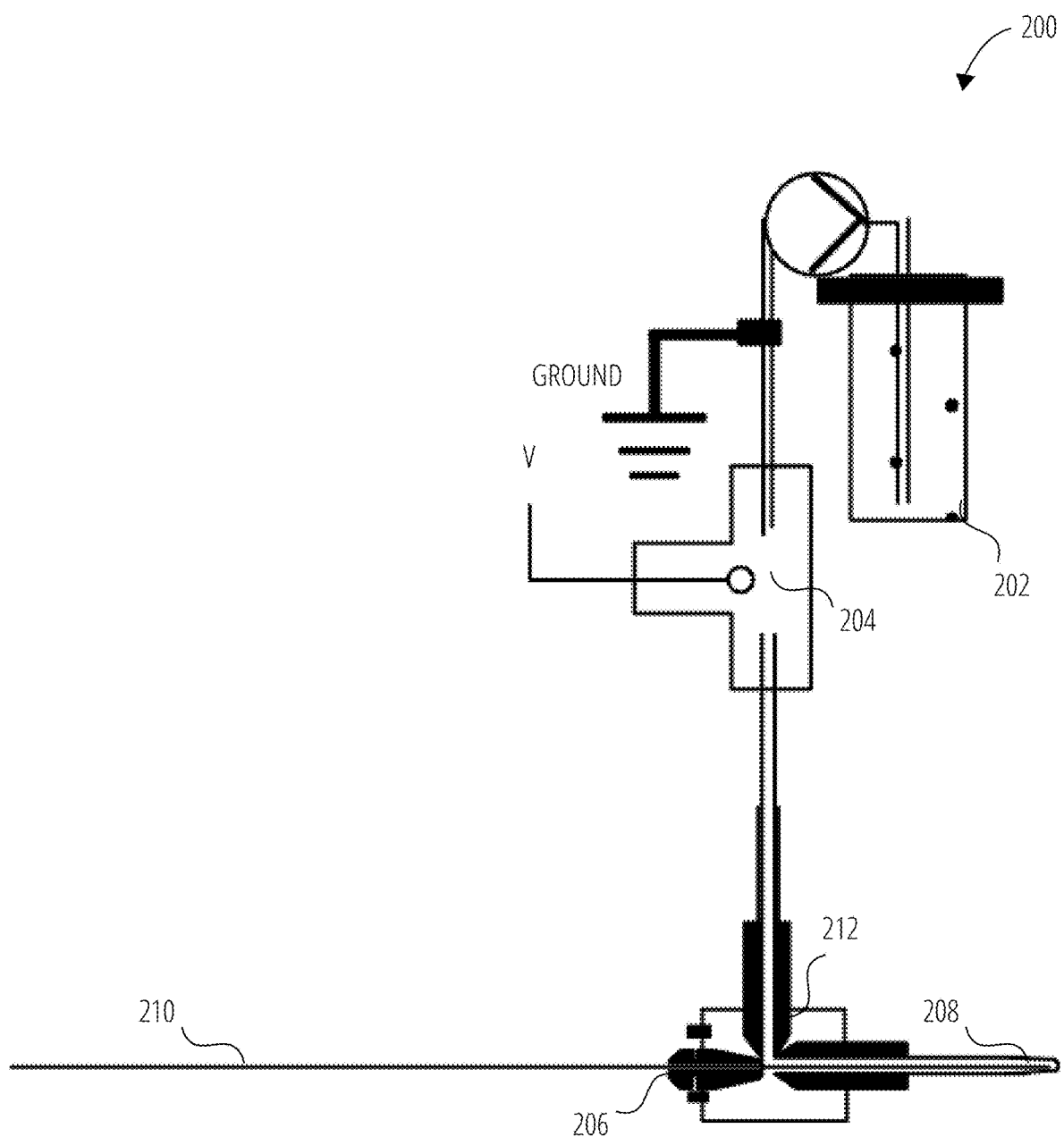
FIG. 2 illustrates an electrospray ionization interface 200 without optical detection in accordance with one embodiment.

FIG. 2 depicts an electrospray ionization interface 200 without optical detection in one embodiment. The electrospray ionization interface 200 comprises a reservoir 202, a voltage junction 204, a fitting 206, a fluid exit port 208, a capillary 210, and an elbow connector 212.

Figure 3:
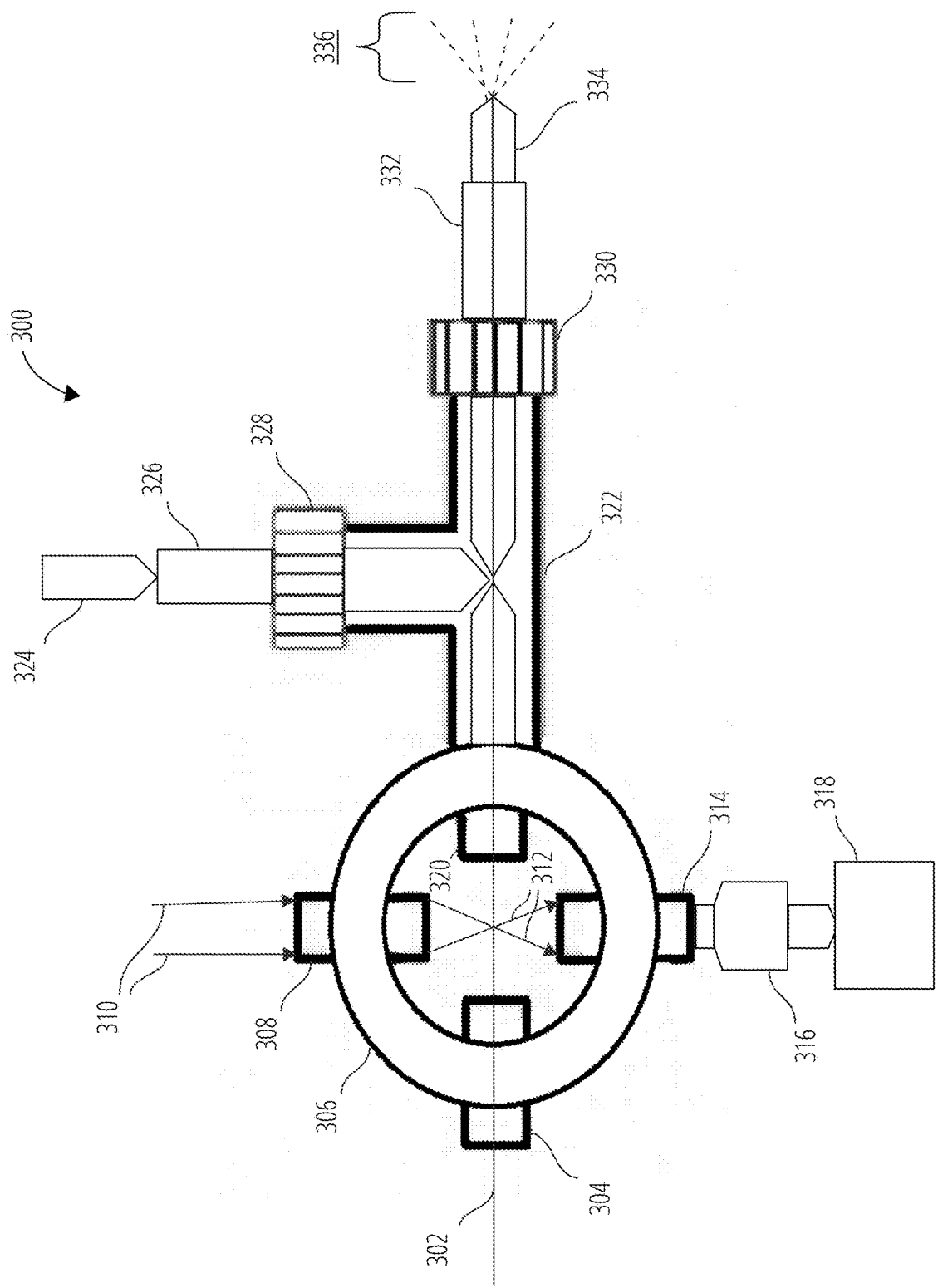
FIG. 3 illustrates an apparatus 300 in accordance with one embodiment.
Figure 4:
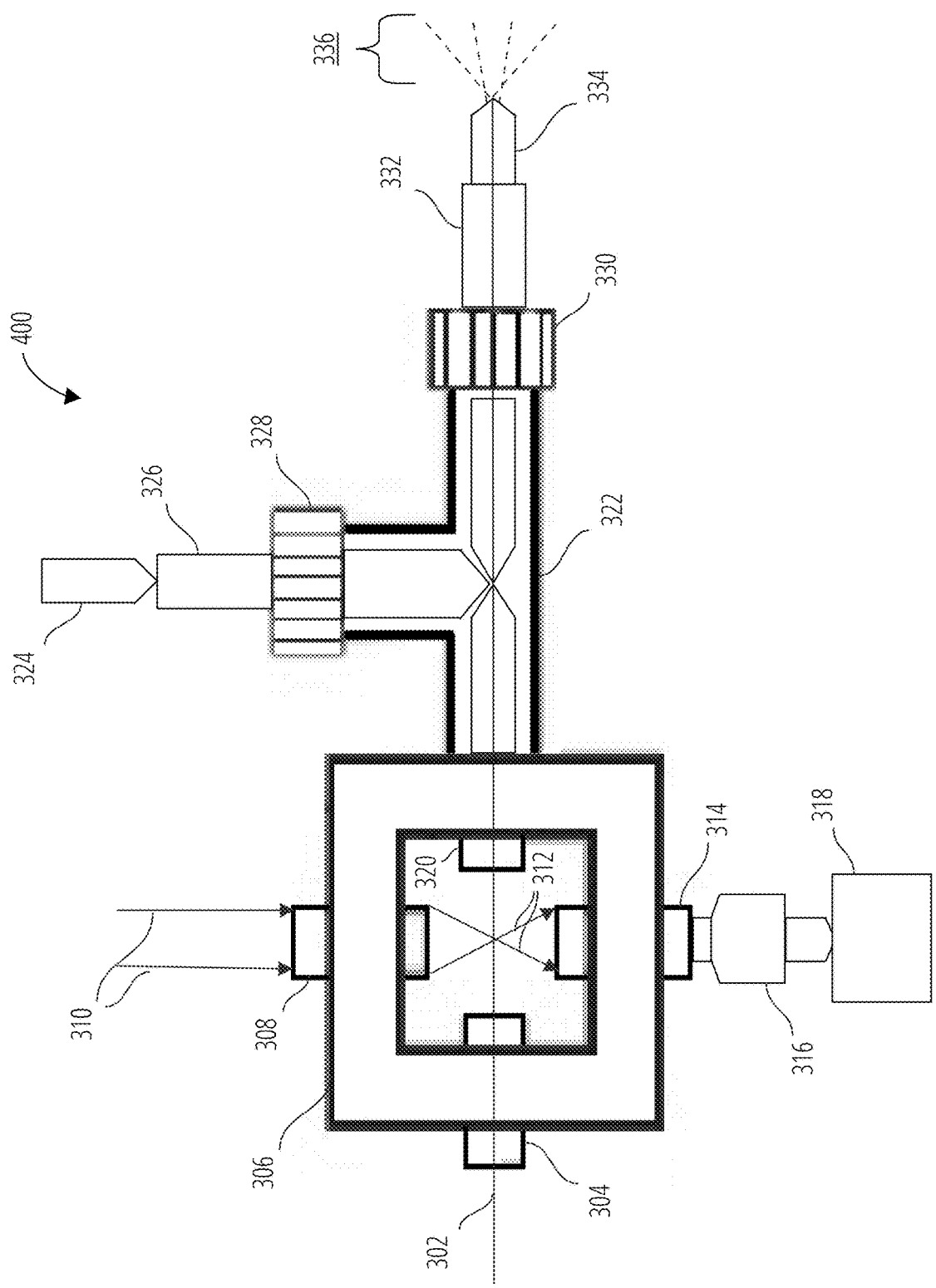
FIG. 4 illustrates an apparatus 400 in accordance with one embodiment.

Referring to FIG. 3 and FIG. 4, an apparatus 300 comprises a capillary 302, an input for the capillary 304, an optical manifold 306, an incident light input 308, an incident light 310, an emitted/transmitted light 312, a collected light output 314, a collected light optics 316, a light detector 318, a fitting 320, an elbow connector 322, a voltage source 324, a tubing 326, a fitting 328, a fitting 330, a sleeve tubing 332, a spray emitter 334, and an electrospray 336. The apparatus 400 depicted in FIG. 4 comprises an optical manifold 306 in place of the optical manifold 306.

The capillary 302 is a narrow tube extending through the input for the capillary 304, the optical manifold 306 (or the optical manifold 306 in the embodiment depicted in FIG. 4), the fitting 320, the elbow connector 322, and the spray emitter 334. The capillary 302 terminates with the spray emitter 334. The capillary 302 traverses a linear path from the input for the capillary 304 to the spray emitter 334. The separation liquid carried by the capillary 302 has optical detection performed by the optical module (i.e., the incident light input 308, the collected light output 314, the collected light optics 316, and the light detector 318). The capillary 302 is aligned in the optical manifold 306 (or the optical manifold 306) to receive the incident light 310 from the incident light input 308 and to emit the emitted/transmitted light 312 into the at least one collected light output 314. The separation or analyte liquid carried by the capillary 302 is then mixed with the electrospray liquid in the spray emitter 334 prior to being emitted as the electrospray 336.

The input for the capillary 304 receives the capillary 302, which may have an inner diameter of about 50 μm and an outer diameter of about 360 um. The contact between the input for the capillary 304 and the capillary 302 may be a microtight fitting that is, designed for microfluidic applications. The input for the capillary 304 may be a septum comprised of rubber, other elastomer, or plastic. The input for the capillary 304 may further be embedded within the optical manifold 306 (or the optical manifold 306).

The optical manifold 306 may be substantially ellipsoid in profile (as depicted in FIG. 3). In other embodiments (i.e., the optical manifold 306 depicted in FIG. 4), the optical manifold is substantially rectangular in profile. The optical manifold 306 aligns the capillary 302 with the incident light input 308 and the collected light output 314 for optical detection. The optical manifold 306 may have the input for the capillary 304, the fitting 320, the incident light input 308, and the collected light output 314 embedded to align these components. The optical manifold 306 may be a rigid structure to inhibit movement of those components relative to each other. The optical manifold 306 may comprise a thermoplastic polymer, such as polyether ether ketone (PEEK).

The incident light input 308 receives the incident light 310 from an incident light source. The incident light input 308 then directs the incident light 310 to the fluid in the capillary 302. The incident light input 308 may be a micro GRIN lens or other optical element or system.

The incident light 310 is produced at an incident light source. The incident light 310 may be configured to produce the light for UV detection, infrared detection, laser-induced fluorescence (LIF) detection, thermo-optical detection, scattering, and/or Raman detection. The incident light 310 is then directed toward the fluid in the capillary 302 to produce the emitted/transmitted light 312.

The emitted/transmitted light 312 results from the interaction of the incident light 310 with the fluid in the capillary 302. The emitted/transmitted light 312 is then collect by the collected light output 314. The emitted/transmitted light 312 may be scattered in multiple directions and collected by plurality of collected light outputs, each orthogonally aligned with the capillary 302.

The collected light output 314 receive the emitted/transmitted light 312. The collected light output 314 then sends the emitted/transmitted light 312 to the collected light optics 316. The collected light optics 316 is a microscope objective utilized to alter the emitted/transmitted light 312 received from the collected light output 314 prior to sending the emitted/transmitted light 312 to the light detector 318. The light detector 318 collects the emitted/transmitted light 312 and determined the optical response of the fluid in the capillary 302 to the incident light 310. The light detector 318 may be configured for UV detection, infrared detection, laser-induced fluorescence (LIF) detection, thermo-optical detection, scattering, and/or Raman detection. Multiple photodetectors of the same or different type may be utilized in embodiments with a plurality of collected light outputs.

The fitting 320 couples the optical manifold 306 with the elbow connector 322. The fitting 320 may hold the capillary 302 to help ensure the capillary 302 is aligned with the incident light input 308 and the collected light output 314. The fitting 320 may be a microtight fitting, that is, designed for microfluid applications, to help ensure that electrospray liquid may not enter the optical manifold 306 from the elbow connector 322.

The elbow connector 322 receives the capillary 302 from the optical manifold 306 and fitting 320. The elbow connector 322 may be enclosed in a rigid housing, which may then be utilized to fasten to the optical manifold 306. The elbow connector 322 further receives the tubing 326 that supplies the electrospray liquid driven by the voltage source 324. The elbow connector 322 may be coupled with the voltage source 324 by the fitting 328. The fitting 328 may be a screw-type (threaded) fitting and comprise a thermoplastic polymer, such as polyether ether ketone (PEEK). The elbow connector 322 forms the annulus with the capillary 302 into which the electrospray liquid may flow. The elbow connector 322 is further couple to the spray emitter 334 by the fitting 330. The fitting 330 may be a screw-type (threaded) fitting and comprise a thermoplastic polymer, such as polyether ether ketone (PEEK). The elbow connector 322 may operate at a low pressure.

The voltage source 324 provides an electrospray voltage to drive the electrospray liquid into the elbow connector 322 and the spray emitter 334, and to emit the electrospray liquid along with the fluid in the capillary 302 as the electrospray 336.

The tubing 326 is coupled to the elbow connector 322 by the fitting 328. The tubing 326 is a fluid pathway for the electrospray liquid to enter the elbow connector 322 from a reservoir or other source. The tubing 326 may be comprised of a material such as a synthetic fluoropolymer of tetrafluoroethylene including polytetrafluoroethylene (PTFE).

The sleeve tubing 332 is a sleeve that may be comprised of a thermoplastic polymer, such as polyether ether ketone (PEEK). The sleeve tubing 332 surrounds a portion of the spray emitter 334. The sleeve tubing 332 may reduce the likelihood of the spray emitter 334 fracturing.

The spray emitter 334 receives electrospray liquid from the elbow connector 322 and fluid from the capillary 302. The spray emitter 334 may be inserted into the sleeve tubing 332. At the tip of the spray emitter 334, the fluids are mixed prior to being emitted as the electrospray 336. The spray emitter 334 may have different embodiments, as depicted in FIG. 11. The spray emitter 334 may be comprised of glass, quartz, ceramic, crystal, etc.

The electrospray 336 is a mixture of the fluid in the capillary 302 and the electrospray liquid. The shape of the tip of the spray emitter 334 may alter the shape, droplet size, etc., of the electrospray 336. The electrospray 336 may then be detected by a MS component.

Figure 5:
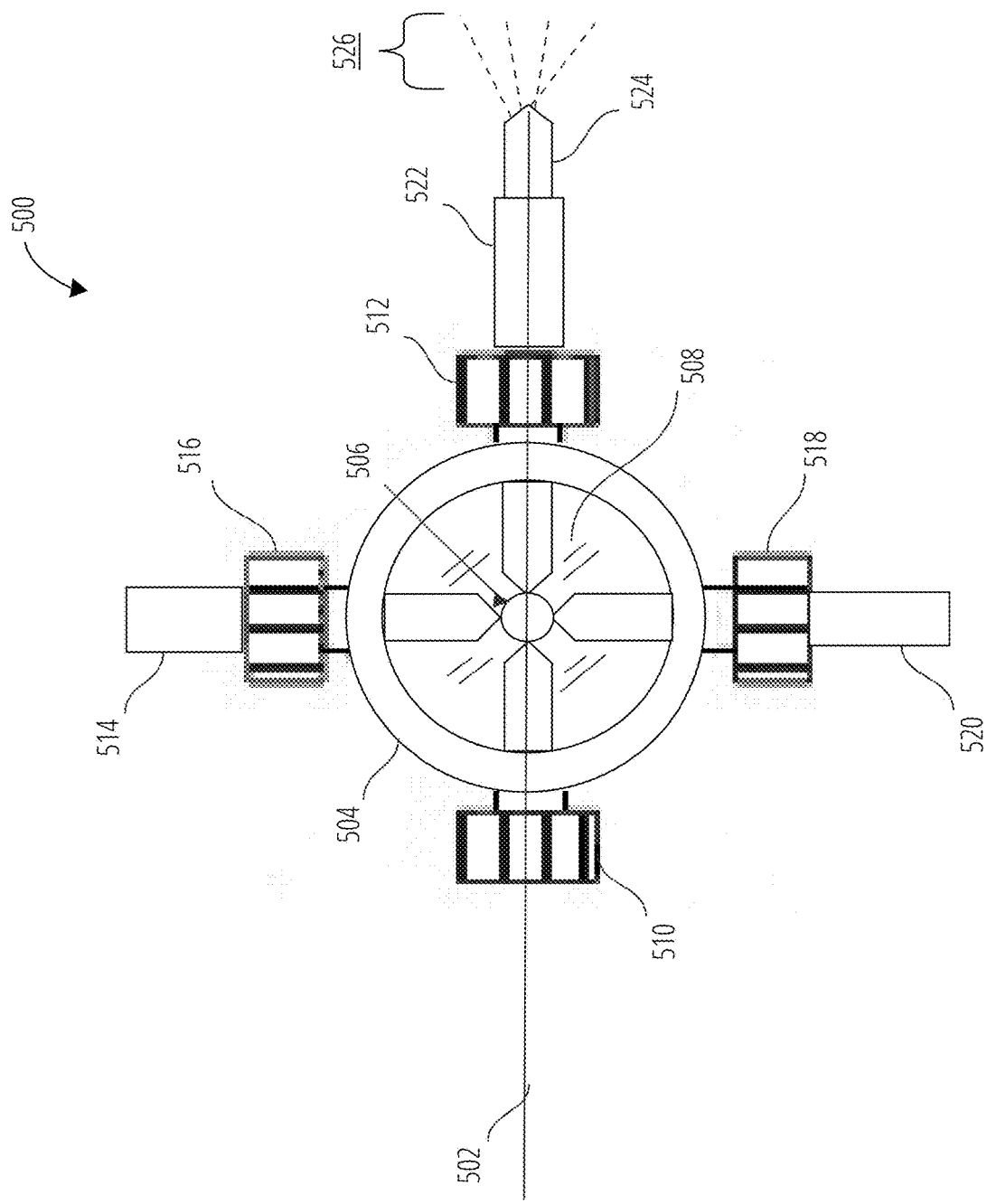
FIG. 5 illustrates an apparatus 500 in accordance with one embodiment.

Referring to FIG. 5, an apparatus 500 comprises a capillary 502, an optical manifold 504, an optical detection zone 506, an optical window 508, a fitting 510, a fitting 512, an inlet tubing 514, a fitting 516, a fitting 518, an outlet tubing 520, a sleeve tubing 522, a spray emitter 524, and an electrospray 526.

The apparatus 500 is a configuration in which the optical manifold and the elbow connector are combined. The electrospray liquid enters into the optical manifold 504 via the inlet tubing 514 and exits the optical manifold 504 through the spray emitter 524. The optical module is oriented orthogonally with the optical detection zone 506 and extend into and out of the page, and are, thus, not depicted in FIG. 5.

The capillary 502 is a narrow tube (e.g., about 50 µm in inner diameter) extending through the fitting 510 (i.e., the input for the capillary), the optical manifold 504, the fitting 512, and the spray emitter 524. The capillary 502 terminates with the spray emitter 524. The capillary 502 traverses a linear path from the fitting 510 to the spray emitter 524. The separation liquid carried by the capillary 502 has optical detection performed by the optical module aligned orthogonally with the capillary 502. The capillary 502 is aligned in the optical manifold 504 to receive incident light from an incident light input and to emit emitted light into at least one collected light output. The separation liquid carried by the capillary 502 is then mixed with the electrospray liquid in the spray emitter 524 prior to being emitted as the electrospray 526.

The optical manifold 504 may be substantially ellipsoid in profile (as depicted). In other embodiments, the optical manifold 504 is substantially rectangular in profile. The optical manifold 504 aligns the capillary 502 with the optical module for optical detection. The optical detection zone 506 is the alignment area for the optical module to send incident light and receive emitted light. The optical manifold 504 may have the fitting 510 and the fitting 512 embedded to align the capillary 502 with the optical module. The optical manifold 504 may have the fitting 516 and the fitting 518 embedded to provide a flow path for electrospray liquid. The electrospray liquid is also directed through an annulus formed by the fitting 512 and the capillary 502, as well as the spray emitter 524 and the capillary 502. The optical manifold 504 comprises the optical window 508 through which the incident light and the emitted light travel. There is an optical window 508 on both the "top" (out of the page) and the "bottom" (into the page) of the optical manifold 504. The optical manifold 504 may comprise a transparent material, such as a glass window. The optical manifold 504 may be a rigid structure to inhibit movement of those components relative to each other. The optical manifold 504 may comprise a thermoplastic polymer, such as polyether ether ketone (PEEK).

The fitting 510, the fitting 512, the fitting 516, and the fitting 518 may be screw or threaded type fittings. These fittings hold the capillary 502 (the fitting 510 and the fitting 512) or the inlet tubing 514 and the outlet tubing 520 (the fitting 516 and the fitting 518, respectively). A portion of each fitting may extend into the optical manifold 504. Each fitting and the optical window 508 is fluid tight to inhibit the electrospray liquid from leaving the optical manifold 504 except through the inlet tubing 514 (in case of backflow), the outlet tubing 520, or the annulus formed by the fitting 512 and the capillary 502. The fittings may be microtight, that is, designed for microfluid applications. The fittings may comprise a thermoplastic polymer, such as polyether ether ketone (PEEK).

The inlet tubing 514 and the outlet tubing 520 direct flow of electrospray liquid into and out of the optical manifold 504. The electrospray liquid may be driven by an electrospray voltage source and/or a pump. The inlet tubing 514 and the outlet tubing 520 may be comprised of a material such as a synthetic fluoropolymer of tetrafluoroethylene including polytetrafluoroethylene (PTFE).

The sleeve tubing 522 is a sleeve that may be comprised of a thermoplastic polymer, such as polyether ether ketone (PEEK). The sleeve tubing 522 surrounds a portion of the spray emitter 524. The sleeve tubing 522 may reduce the likelihood of the spray emitter 524 fracturing.

The spray emitter 524 receives electrospray liquid from the optical manifold 504 and fluid from the capillary 502. The spray emitter 524 may be inserted into the sleeve tubing 522. At the tip of the spray emitter 524, the fluids are mixed prior to being emitted as the electrospray 526. The spray emitter 524 may have different embodiments, as depicted in FIG. 11. The spray emitter 524 may be comprised of glass, quartz, ceramic, crystal, etc.

The electrospray 526 is a mixture of the fluid in the capillary 502 and the electrospray liquid. The shape of the tip of the spray emitter 524 may alter the shape, droplet size, etc., of the electrospray 526. The electrospray 526 may then be detected by a MS component.

Figure 6:
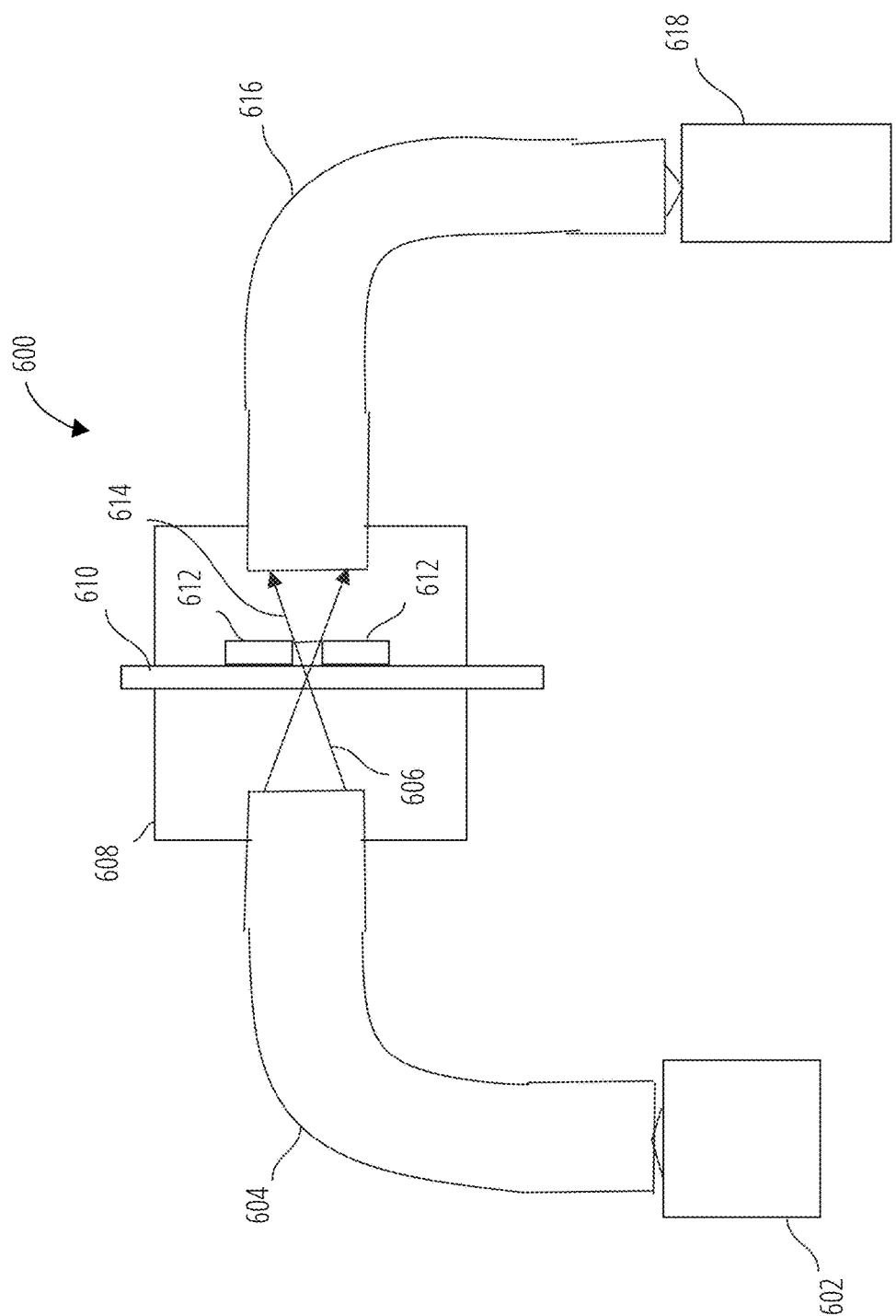
FIG. 6 illustrates an optical module for UV detection 600 in accordance with one embodiment.

Referring to FIG. 6, an optical module for UV detection 600 comprises an ultraviolet source 602, an incidence ultraviolet fiber 604, incident ultraviolet light 606, an optical manifold 608, a capillary 610, an aperture 612, transmitted ultraviolet light 614, a transmission ultraviolet fiber 616, and a photodiode 618.

The ultraviolet source 602 generates UV light. The ultraviolet source 602 may be configured to generate a specific wavelength of UV light, multiple specific wavelengths, or a range of wavelengths. A band pass interference filter may be utilized to select the wavelength from an ultraviolet source 602 that emit a range of frequencies. A UV laser may be utilized to generate a specific wavelength of UV light. The UV light is then transmitted to the incidence ultraviolet fiber 604, which may be coupled to the ultraviolet source 602.

The incidence ultraviolet fiber 604 carries the incident ultraviolet light 606 to the optical manifold 608. The incidence ultraviolet fiber 604 may be flexible and of varying length. The incidence ultraviolet fiber 604 may be single-mode or multi-mode optical fiber. The incident ultraviolet light 606 is emitted into the optical manifold 608 toward the capillary 610 by the incidence ultraviolet fiber 604.

The optical manifold 608 includes the capillary 610 and the aperture 612. The optical manifold 608 orients the capillary 610 orthogonal to the incident ultraviolet light 606 and the transmission ultraviolet fiber 616, such that the incident ultraviolet light 606 is directed toward the optical window on the capillary 610. The incident ultraviolet light 606 interacts with fluid, such as analyte liquid or separation liquid, in the capillary 610 to produce the transmitted ultraviolet light 614. The transmitted ultraviolet light 614 may pass through the aperture 612 to determine the cone angle of the transmitted ultraviolet light 614 that is focused onto the transmission ultraviolet fiber 616.

The transmission ultraviolet fiber 616 receives the transmitted ultraviolet light 614 from the optical manifold 608. The transmission ultraviolet fiber 616 may be flexible and of varying length. The transmission ultraviolet fiber 616 may be single-mode or multi-mode optical fiber. The transmitted ultraviolet light 614 is directed to the photodiode 618. The photodiode 618 collects the transmitted ultraviolet light 614 and determines the optical response of the fluid in the capillary 610 to the incident ultraviolet light 606. The photodiode 618, in this embodiment, is configured for UV detection. The photodiode 618 may be a photodiode array. Multiple photodiodes of the same or different type may be utilized in embodiments with a plurality of collected light outputs. The transmission ultraviolet fiber 616 and the photodiode 618 may comprise the collected light output.

Figure 7:
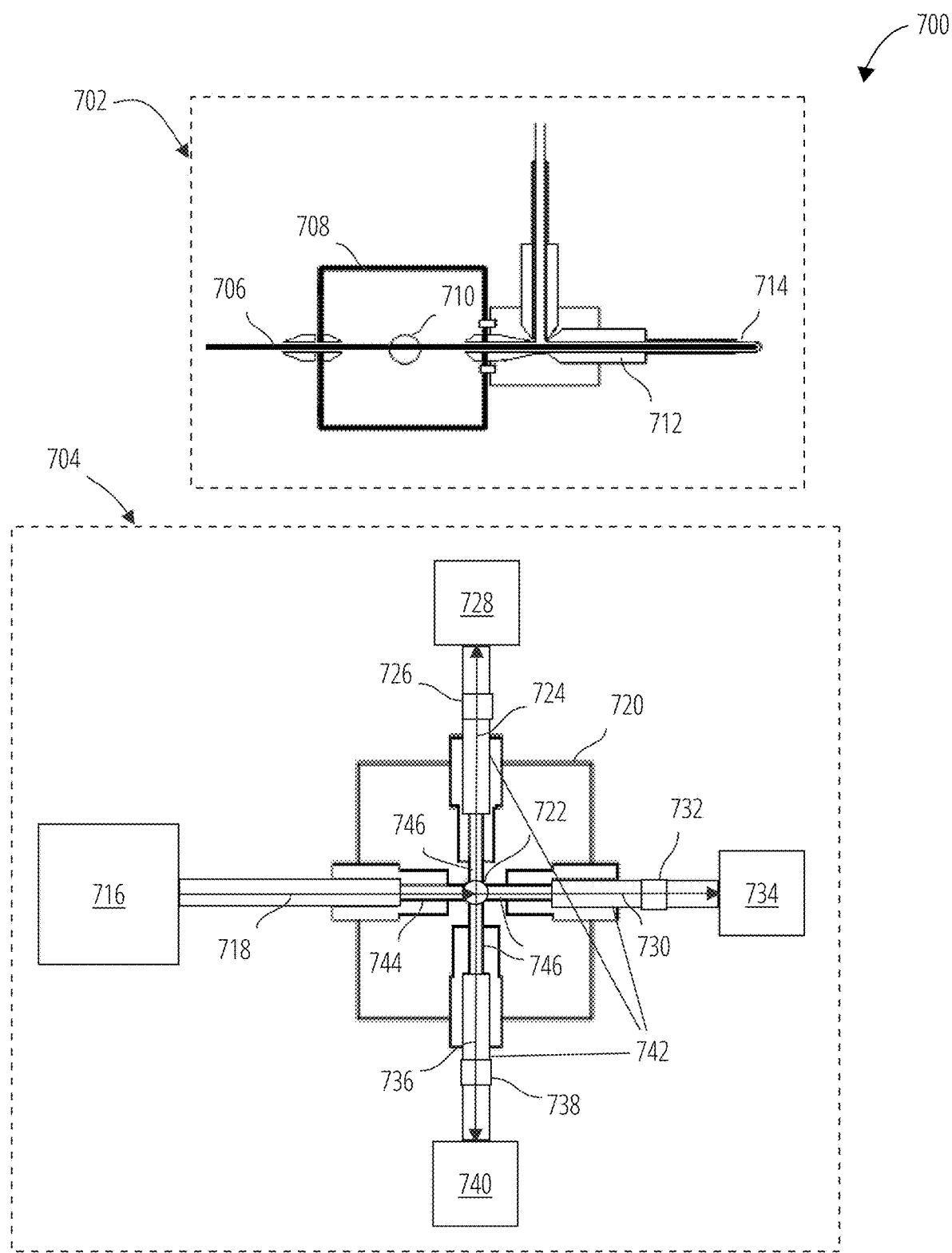
FIG. 7 illustrates OptoESI interface 700 with single-excitation laser-induced fluorescence in accordance with one embodiment.

Referring to FIG. 7, OptoESI interface 700 comprise an ultraviolet OptoESI interface 702 and a laser-induced fluorescence OptoESI interface 704. The ultraviolet OptoESI interface 702 comprises a capillary 706, an optical manifold 708, a single orthogonal optical window 710, an elbow connector 712, and a spray emitter 714. The laser-induced fluorescence OptoESI interface 704 comprises an excitation source 716, excitation light 718, an optical manifold 720, a capillary 722, emitted light 724, an emission filter 726, a photdetector 728, emitted light 730, an emission filter 732, a photodetector 734, emitted light 736, an emission filter 738, and a photodetector 740. The OptoESI interface 700 further includes excitation micro optics 744, emission fiber optics 742, and emission micro optics 746.

The ultraviolet OptoESI interface 702 utilizes a configuration similar to that depicted in FIG. 1. The capillary 706 carries the separation liquid to the spray emitter 714 driven by a voltage source. The capillary 706 is inserted through a fitting (the input for the capillary) into the optical manifold 708, further into the elbow connector 712, and terminating in the spray emitter 714. At the single orthogonal optical window 710 of the optical manifold 708, UV light may interact with the separation liquid to produce emitted light. For example, the optical module for UV detection 600 may be utilized. Further, electrospray liquid is received by the elbow connector 712, which is then transferred to the spray emitter 714 through an annulus formed by the capillary 706 and the elbow connector 712. The annulus continues into the spray emitter 714 until the capillary 706 terminates. The separation liquid and the electrospray liquid are then combined in the spray emitter 714 prior to emission from the spray emitter 714.

The laser-induced fluorescence OptoESI interface 704 utilizes a photodetectors. Each of the photodetectors may collect a different primary color of emitted light from the capillary 722. The excitation source 716 may produce the excitation light 718, which may include light of various wavelengths. For example, the excitation source 716 may produce red, green, yellow, and blue excitation light 718. Each may be produced by a laser, light emitting diode, or other light source. The excitation light 718 is directed to the optical manifold 720, which houses the capillary 722. The capillary 722 is aligned orthogonal to the excitation light and the plurality of collected light outputs.

At the optical window, the excitation light 718 is focused into the capillary 722 channel using the excitation micro optics 744. The excitation micro optics 744 may be a fiber-coupled GRIN lens or other optical device or system. The focused excitation light 718 interacts with the separation liquid flowing through the capillary 722. The emitted light 724, the emitted light 730, and the emitted light 736 are produced from the interaction.

The emitted light 724 passes through the emission filter 726, which may filter the emitted light 724 to select a specific wavelength (e.g., blue wavelength). The emitted light 724, the emitted light 730, and the emitted light 736 are collected through the emission emission micro optics 746. The emission micro optics 746 may be implemented with a fiber coupled GRIN lens or other optical systems. The emitted light 730 passes through the emission filter 732, which may filter the emitted light 730 to select a specific wavelength (e.g., green wavelength). The emitted light 736 passes through the emission filter 738, which may filter the emitted light 736 to select a specific wavelength, (e.g., red wavelength). The emission filter 726, the emission filter 732, and the emission filter 738 may be a bandpass filter, long pass filter, or short pass filter. The photdetector 728, the photodetector 734, and the photodetector 740 then detect for the filtered emitted light 724 (e.g., blue wavelength), the filtered emitted light 730 (e.g., green wavelength), and filtered emitted light 736 (e.g., red wavelength), respectively. In other embodiments, the photodetectors may detect light of other wavelengths than that described in the exemplary embodiment. The photodetectors may be utilized with an emission filter specific to the wavelength(s) to be detected.

Figure 8:
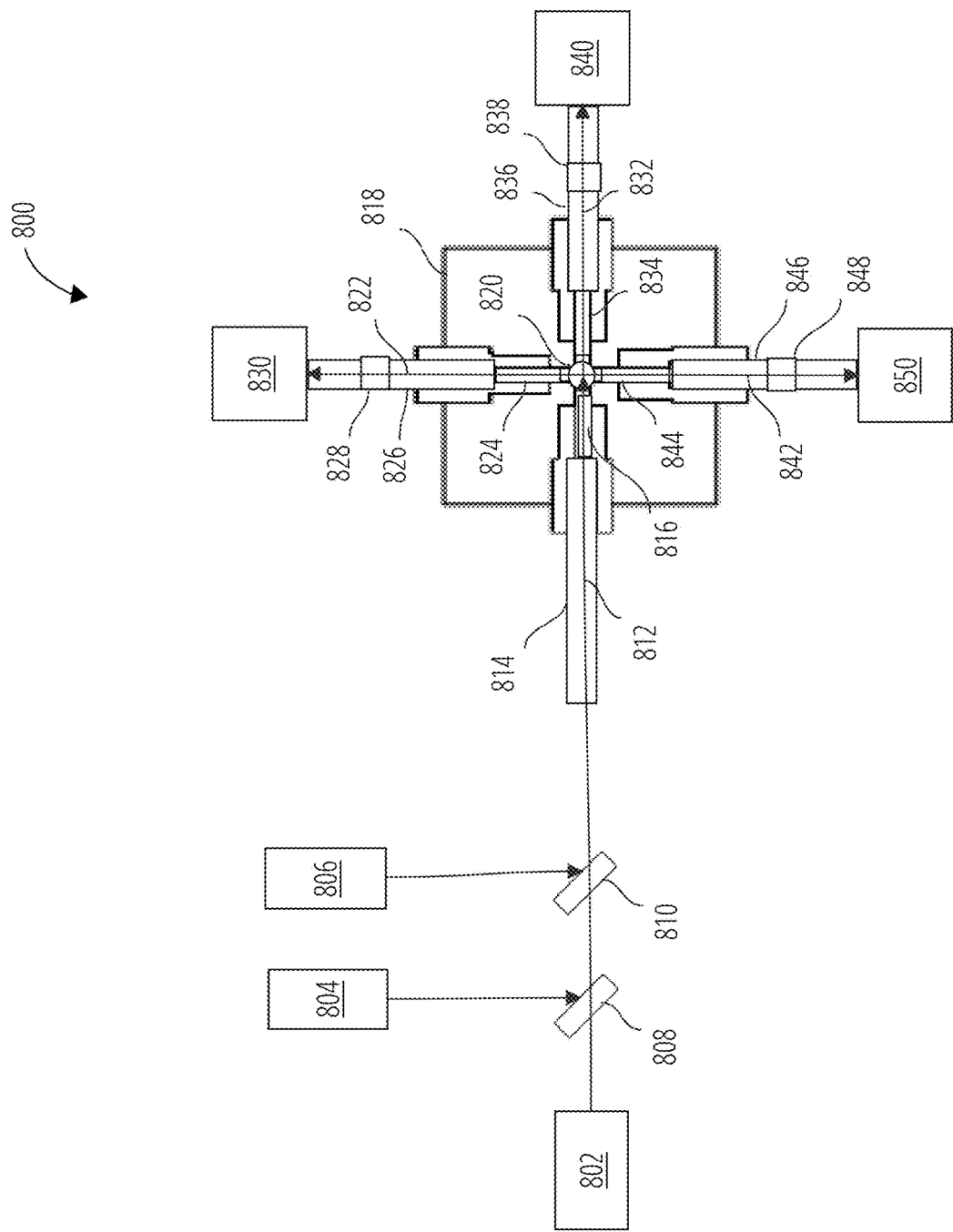
FIG. 8 illustrates an OptoESI interface 800 with multiplexed laser-induced fluorescence in accordance with one embodiment.

Referring to FIG. 8, an OptoESI interface 800 with multiplexed laser-induced fluorescence comprises a laser 802, a laser 804, a laser 806, a dichroic beam splitter 808, a dichroic beam splitter 810, an excitation light 812, an excitation optics 814, an optical manifold 818, a capillary 820, an emitted light 822, a micro GRIN lens 824, an emission optics 826, an emission filter 828, a photodetector 830, an emitted light 832, a micro GRIN lens 834, an emission optics 836, an emission filter 838, a photodetector 840, an emitted light 842, a micro GRIN lens 844, an emission optics 846, an emission filter 848, and a photodetector 850.

The OptoESI interface 800 utilizes a plurality of lasers coupled to an incident light input (i.e., the excitation optics 814 and/or the micro GRIN lens 816) and the photodetectors, each having their own channel. Each of the photodetectors collects a different primary color of emitted light from the capillary 820.

The laser 802, the laser 804, and the laser 806 may for example produce blue, green, and red light, respectively. The dichroic beam splitter 808 combines the blue and green light. The dichroic beam splitter 810 further combines the output of the dichroic beam splitter 808 with the red light to produce the excitation light 812. The excitation light 812 is directed by the excitation optics 814 to the optical window of the optical manifold 818. The excitation optics 814 may be single-mode or multi-mode optical fiber. The micro GRIN lens 816, which may be embedded within the optical manifold 818, interacts with the excitation light 812 to focus the excitation light 812 onto an object plane within the capillary 820. The micro GRIN lens 816 may be positioned in the optical manifold 818 to place the object plane within the capillary 820. The positioning and thus distance from the capillary 820 may be based on the physical characteristics of the micro GRIN lens 816, including the object working distance and the image working distance. The micro GRIN lens 816 may have a diameter of about 0.1 mm or more. The length of the micro GRIN lens 816 may be about 0.5 mm or more. The excitation light 812 interacts with the separation liquid within the capillary 820 to produce the emitted light 822, the emitted light 832, and the emitted light 842. Here, the capillary axis propagates through the plane of the drawing.

Each of the emission channels may include a micro GRIN lens (e.g., the micro GRIN lens 824, the micro GRIN lens 834, and the micro GRIN lens 844, respectively), emission optics (e.g., the emission optics 826, the emission optics 836, and the emission optics 846, respectively), an emission filter (e.g., the emission filter 828, the emission filter 838, and the emission filter 848), and a photodetector (e.g., the photodetector 830, the photodetector 840, and the photodetector 850). The combination of the micro GRIN lens, the emission optics, the emission filter, and the photodetector is a channel. Each micro GRIN lens is configured to the object plane of the capillary 820. The micro GRIN lenses are placed within the optical manifold 818 at a distance from the capillary 820 such that the object plane is within the capillary 820. The distance may be based on the physical characteristics of the micro GRIN lens. The emission optics may be single-mode or multi-mode optical fiber. Each emission filter filters light except for a specific different primary color. The emission filter 828 may for example filter for blue light, the emission filter 838 filter for red light, and the emission filter 848 filter for green light. The emitted light 822 that is filtered is received by the photodetector 830, which collects and detects blue light. The emitted light 832 that is filtered is received by the photodetector 840, which collects and detects red light. The emitted light 842 that is filtered is received by the photodetector 850, which collects and detects green light. The photodetectors may be devices such as a photomultiplier, a hybrid photomultiplier, an avalanche photodiode, a single photon avalanche diode, etc.

In some embodiments, the channels may be arranged circularly. Such embodiments may be preferred with substantially ellipsoid optical manifolds. Further, many channels (i.e., greater than the three depicted) may be placed around the circumference of the capillary 820. The micro GRIN lens for such a channel may be adjusted such that the object plane lies within the capillary 820. Each emission channel may correspond to a different light emission. In yet further embodiments, each emission channel may be multiplexed downstream by utilizing optical beam splitters. The emission filter may be placed after the splitter to provide detection of multiple wavelengths, based on the characteristics of the emission filters. Finally, the excitation optics 814 may operate as an emission optics as wells, receiving emitted light back from the capillary 820.

Figure 9:
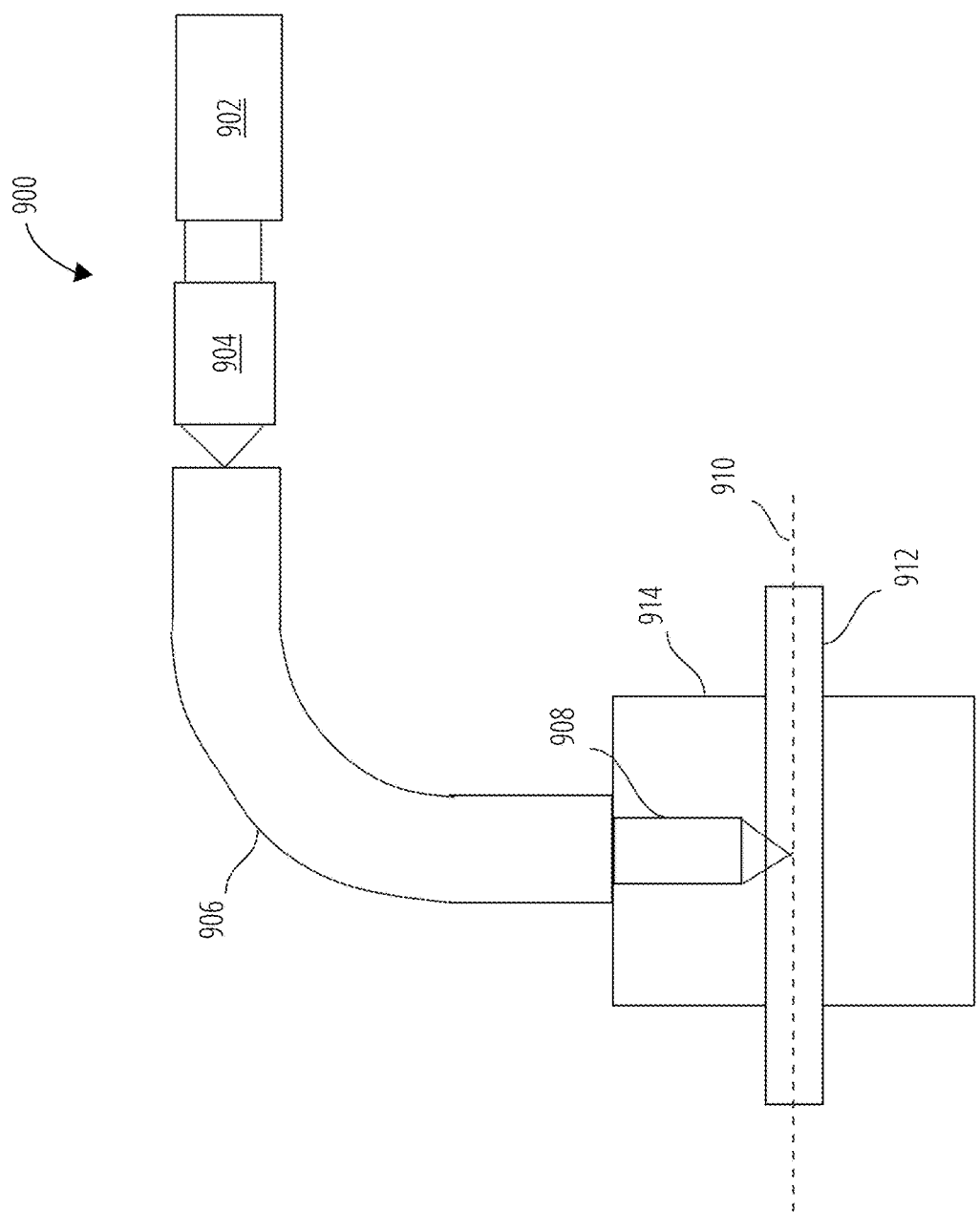
FIG. 9 illustrates excitation collection optics 900 for laser-induced fluorescence in accordance with one embodiment.

Referring to FIG. 9, excitation collection optics 900 comprises a laser 902, a collimator 904, an excitation fiber optics 906, a micro GRIN lens 908, an object plane 910, a capillary 912, and an optical manifold 914.

The laser 902 generates excitation light (or incident light). The light comprises one or more wavelengths. The excitation light is directed to the collimator 904. The collimator 904 narrows the excitation light for transmission by the excitation fiber optics 906. The excitation fiber optics 906 may be single-mode or multi-mode optical fiber. The excitation fiber optics 906 are coupled to a micro GRIN lens 908. The micro GRIN lens 908 focuses the excitation light onto the object plane 910. The micro GRIN lens 908 is configured to have the object plane 910 lie within the capillary 912, which is fixed within the optical manifold 914. The micro GRIN lens 908 may be positioned in the optical manifold 914 to place the object plane 910 within the capillary 912. The positioning and thus distance from the capillary 912 may be based on the physical characteristics of the micro GRIN lens 908, including the object working distance and the image working distance. The micro GRIN lens 908 may have a diameter of about 0.1 mm or more. The length of the micro GRIN lens 908 may be about 0.5 mm or more. The micro GRIN lens 908 may also be embedded within the optical manifold 914. As separation liquid flows through the capillary 912 and excitation light is being focused on the separation liquid in the capillary 912, emitted light is generated. The emitted light may be received by a device such as the emission collection optics 1000.

Figure 10:
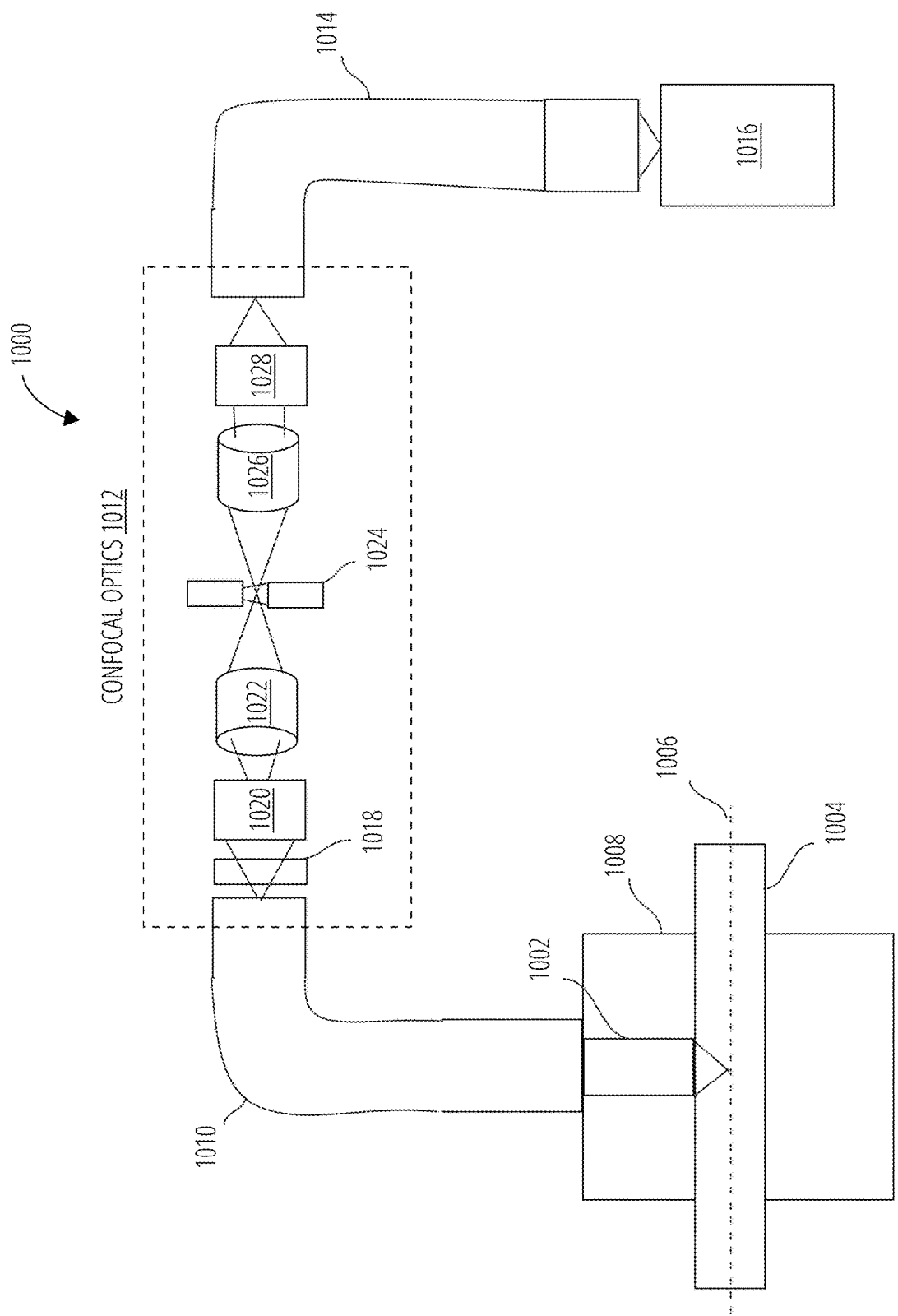
FIG. 10 illustrates emission collection optics 1000 for laser-induced fluorescence in accordance with one embodiment.

Referring to FIG. 10, emission collection optics 1000 comprises a micro GRIN lens 1002, a capillary 1004, an object plane 1006, an optical manifold 1008, fiber optics 1010, confocal optics 1012, fiber optics 1014, a detector 1016, an emission filter 1018, a collimator 1020, an achromatic lens 1022, an aperture 1024, an achromatic lens 1026, and a collimator 1028.

The micro GRIN lens 1002 receives emitted light produced from the interaction of excitation light (or incident light) with separation liquid flowing through the capillary 1004. The micro GRIN lens 1002 is configured to have the object plane 1006 lie within the capillary 1004. The micro GRIN lens 1002 may be positioned in the optical manifold 1008 to place the object plane 1006 within the capillary 1004. The positioning and thus distance from the capillary 1004 may be based on the physical characteristics of the micro GRIN lens 1002, including the object working distance and the image working distance. The capillary 1004 is held in place by the optical manifold 1008 to inhibit movement of the capillary 1004 relative to the object plane 1006. The emitted light received by the micro GRIN lens 1002 is transmitted via the fiber optics 1010 to the confocal optics 1012. The fiber optics 1010 may be single-mode or multi-mode optical fiber. The confocal optics 1012 alter the emitted light as described below and transmit the altered emitted light to the detector 1016 via the fiber optics 1014. The fiber optics 1014 may be single-mode or multi-mode optical fiber. The detector 1016 is at least one collected light output. The collected light output may be a detector, such as a photomultiplier, a hybrid photomultiplier, an avalanche photodiode, a single photon avalanche diode, etc.

The confocal optics 1012 increases the optical resolution and contrast of the emitted light by blocking some of the emitted light that is out-of-focus. The emission filter 1018 may be configured to filter emitted light for a specified wavelength or range or wavelength. The collimator 1020 produces parallel rays of the emitted light for transmission through the achromatic lens 1022. The achromatic lens 1022 is configured to limit the effects of chromatic and spherical aberration. The achromatic lens 1022 focuses multiple wavelengths onto the same plane. The aperture 1024 is a hole or an opening through which the filtered emitted light travels. The aperture 1024 and the focal length to the achromatic lens 1026 determine the cone angle of the rays of the filtered emitted light that come to a focus in the image plane of the achromatic lens 1026. The achromatic lens 1026 is configured to mirror the achromatic lens 1022. The collimator 1028 then narrows the filtered emitted light for transmission by the excitation fiber optics 1014. The confocal optics may be coupled between the incident light input and the at least one collected light output. The confocal optics 1012 may be assembled for example in a 1 cm diameter tube with a length of about 5 cm or more. The confocal optics 1012 may be re-configurable.

The excitation collection optics 900 and the emission collection optics 1000 utilize a micro optics-based design. Such a design increases the ease of alignment and integration, produces a smaller footprint, and may easily provide multiplexing. Additionally, the design may be utilized for other optical modes including but not limited to thermo-optical detection, Raman detection, etc. When being utilized as part of a LIF detection apparatus, the excitation collection optics 900 and the emission collection optics 1000 may be utilized without the ESI component (i.e., online and offline). Further, the excitation collection optics 900 and the emission collection optics 1000 may be multiplexed for multicolor LIF detection. Finally, such a design may be utilized in confocal imaging applications. Designs utilizing the confocal optics may be further multiplexed with splitters inserted in the confocal optics.

Referring to FIG. 11, spray emitters 1100 comprises a spray emitter 1102, a spray emitter 1104, a spray emitter 1106. Each of the spray emitters 1100 comprises a length 1108, an outer diameter 1110, an inlet diameter 1112, an outlet diameter 1114, an internal tapered portion 1116, a coating 1118, and an emitter tip 1120. The spray emitter 1106 has an additional excess portion 1122.

The length 1108 may be about 5-100 mm. The outer diameter 1110 may be about 0.2-3.0 mm. The inlet diameter 1112 may be about 50-2000 µm. The outlet diameter 1114 may be about 5-200 µm. The length of the internal tapered portion 1116 may be about 0.1-5 mm. The internal tapered portion 1116 may taper from the inlet diameter 1112 to the outlet diameter 1114 linearly, curved, etc. The coating 1118 may extend over the spray emitter from the inlet end. The portion covered may be any proportion. For example, the coating 1118 may extend to the beginning of the internal tapered portion 1116. The emitter tip 1120 may be configured differently for each of the spray emitter 1102, the spray emitter 1104, and the spray emitter 1106. The spray emitter 1102 maintains the outer diameter 1110 until the emitter tip 1120. The spray emitter 1104 tapers the outer diameter 1110 for a portion of the internal tapered portion 1116. For example, the taper of the outer diameter 1110 begins at the midpoint from the beginning of the internal tapered portion 1116 and tapers linearly to the emitter tip 1120. In other embodiments, the taper may produce a convex or concave shape. For the spray emitter 1106, the internal tapered portion 1116 begins closer to the inlet. The length of the internal tapered portion 1116 is similar to those depicted by the spray emitter 1102 and the spray emitter 1104. However, the bottom portion (as depicted in the FIG. 11) extends beyond the outlet. Such a configuration may be achieved by creating the spray emitter 1106 with the excess portion 1122 (depicted in dashed lines) and then chamfer the excess portion 1122. In other embodiments, both the top and bottom excess portion 1122 may be chamfered to form a wedge-shaped tip.

The extra glass, quartz, ceramic, crystal, etc., mass at the outlet of the spray emitters 1100 increases the robustness of the spray emitters. In one embodiment (U.S. Pat. Nos. 9,465,014 and 9,234,880), the design utilizes a thermally pulled spray emitter, which is fragile and less robust. Such a design is easily damaged when the separation capillary bumps against the emitter tip 1120. The design is also more susceptible to dielectric breakdown when operated under high voltage for a very long time. The design does not utilize an external coating that provides protection for the glass emitter. In another embodiment (U.S. Pat. No. 8,613,845), the design utilizes an internally tapered stainless steel tubing which is opaque and cannot produce electrokinetic nanoflow.

The spray emitters 1100 may have wide angle inner cones (i.e., internal tapered portion 1116) that permit the separation capillary outlet to be close to the spray emitter outlet without fracturing the emitter tip wall, which improves sensitivity of subsequent MS readings. The coating 1118 may be a polymer coating around the glass spray emitter that increases the glass ruggedness and reduces the likelihood of a fracture to the spray emitter. In some embodiments, the spray emitters 1100 may not utilize the coating 1118.

The spray emitters 1100 may have wide angle inner cones (i.e., internal tapered portion 1116) that permit the separation capillary outlet to be close to the spray emitter outlet without fracturing the emitter tip wall, which improves sensitivity of subsequent MS readings. The coating 1118 may be a polymer coating around the glass spray emitter that increases the glass ruggedness and reduces the likelihood of a fracture to the spray emitter. In some embodiments, the spray emitters 1100 may not utilize the coating 1118.

Thus in various embodiments, the spray emitters 1100 may include a tip tapered coaxially outward at an obtuse angle from an inlet of the spray emitter. The tip may have a greater wall thickness at a joint with the inlet of the spray emitters, and in some embodiments the thickness may be greater on one side of the tip.

Figure 12:
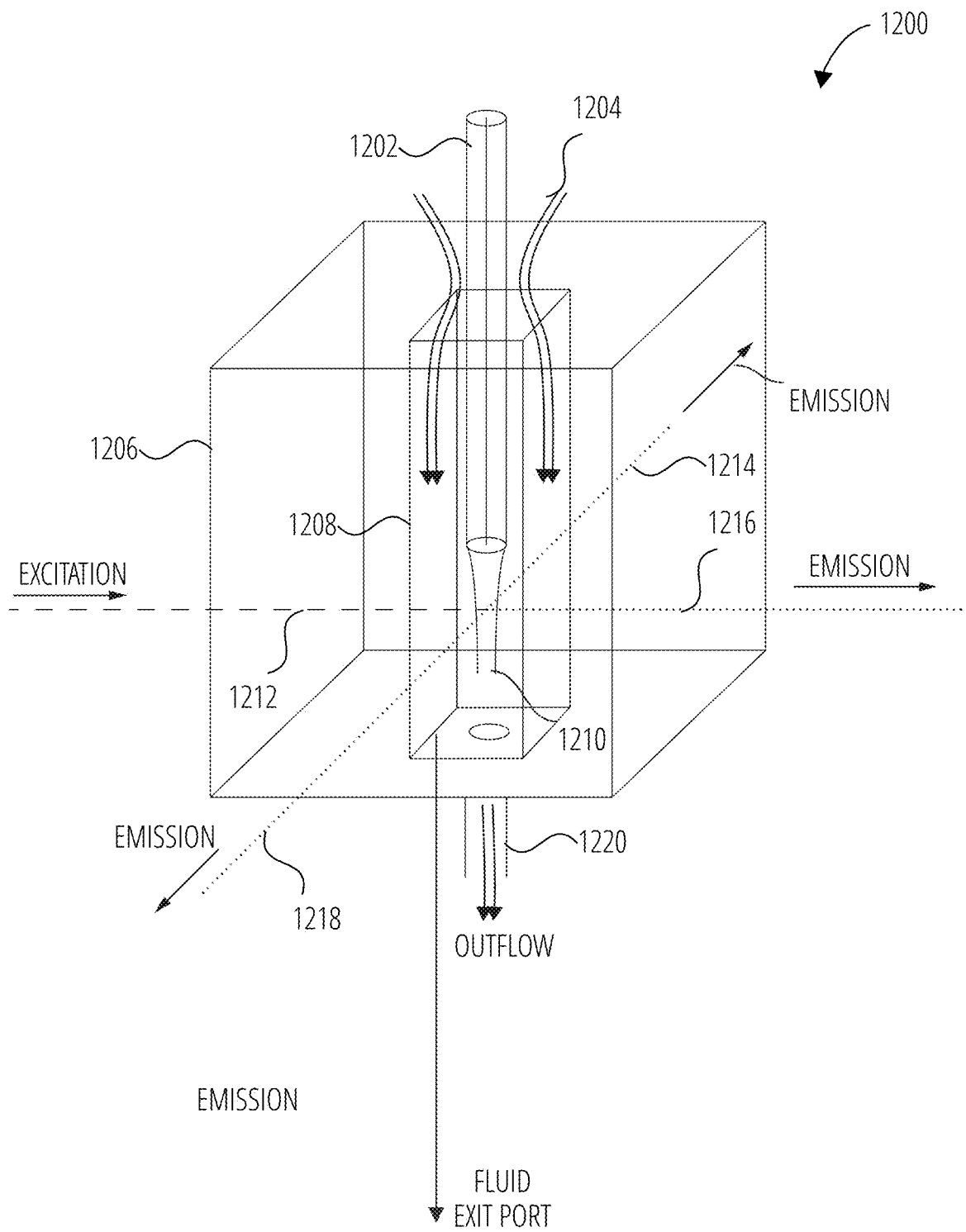
FIG. 12 illustrates optical configuration 1200 for post-column optical detection in a capillary flow system in accordance with one embodiment.

FIG. 12 depicts an optical configuration 1200 which may utilize the excitation collection optics 900 for laser-induced fluorescence and the emission collection optics 1000 for post-column detection in a capillary flow system in one embodiment. The optical configuration 1200 comprises a capillary 1202, a sheath liquid inflow 1204, a cuvette manifold 1206, a cuvette 1208, an excitation channel 1212, and in this example three emission channels: emission channel 1214, emission channel 1216, and emission channel 1218. A flow channel outlet 1220 for capillary effluent 1210 is also depicted.

The optical configuration 1200 is an example of a sheath flow cuvette that may be utilized for post-column detection of effluents exiting the capillary 1202. Here the excitation light interacts with the liquid as it exits the capillary 1202. The profile of the capillary effluent 1210 exiting the capillary 1202 is controlled and maintained for detection using the sheath liquid inflow 1204 within the cuvette 1208 and around the capillary 1202. The cuvette 1208 may for example be made of glass and have a square cross sectional profile, with out dimensions for example of 2×2×20 mm and channel dimensions of 0.25×0.25×20 mm. These dimensions may vary depending on the dimensions of the capillary 1202. The cuvette 1208 may also have a cylindrical or other geometric cross section. The cuvette 1208 may be disposed within the cuvette manifold 1206 and then the capillary 1202 may be disposed within the cuvette 1208. The cuvette cuvette manifold 1206, cuvette 1208, and capillary 1202 are tightly fitted such that the sheath liquid inflow 1204 is constrained within the cuvette 1208 and exits the flow channel outlet 1220. The sheath liquid inflow 1204 hydrodynamically constrains the flow stream from the capillary 1202 to maintain a narrow flow stream within the cuvette 1208.

Conventional approaches utilize large optical elements that are difficult to miniaturize. The optical configuration 1200 may be utilized with smaller optical components such as micro GRIN lenses, for post-column optical detection without an electrospray emitter. The optical configuration 1200 may also have utility in time-resolved fluorescence detection, single molecule detection, fluorescence correlation spectroscopy, photothermal spectroscopy, and flow cytometry, for example.

Figure 13:
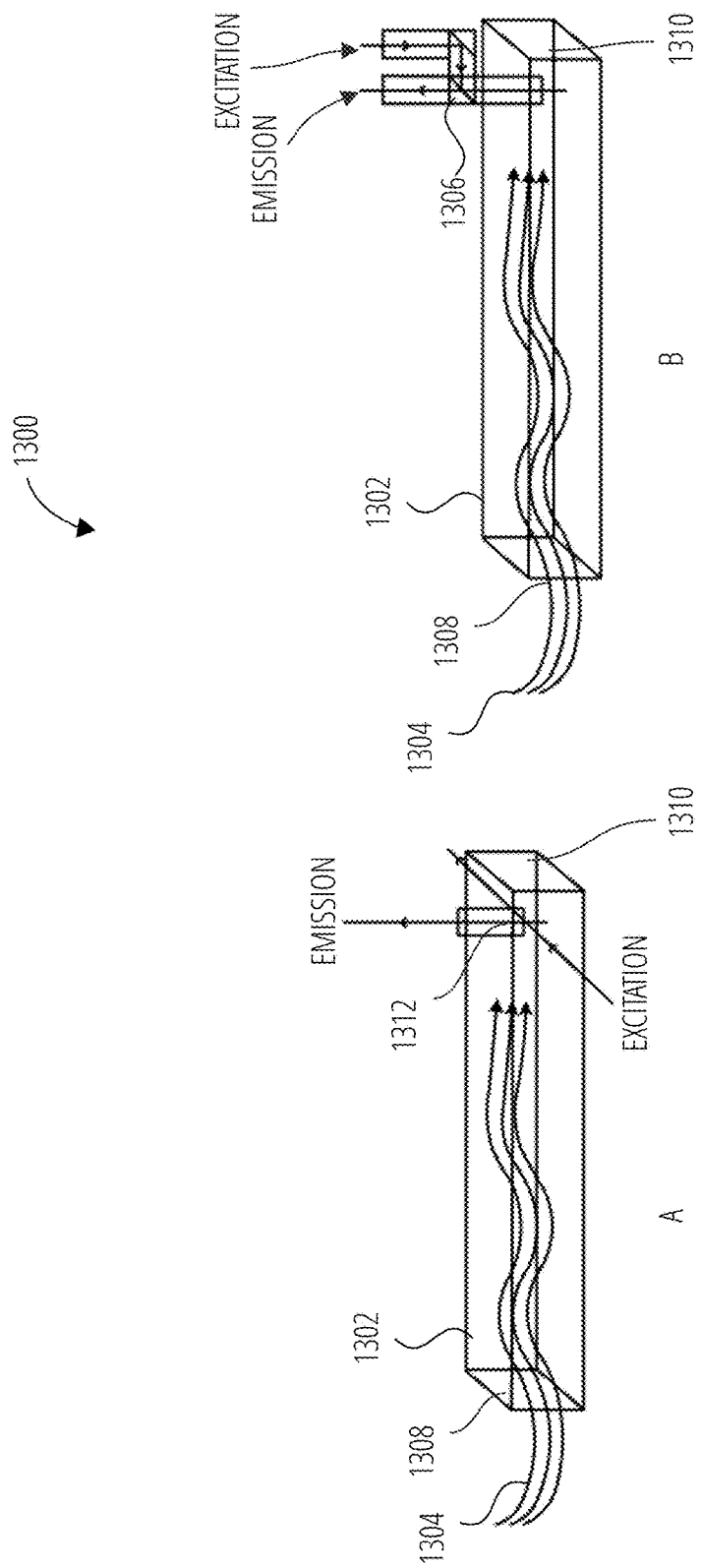
FIG. 13 illustrates an optical configuration 1300 for use in microfluidic channels in accordance with one embodiment.

FIG. 13 depicts optical configuration 1300 in one embodiment. A microfluidic channel 1302 provides a fluid inflow 1304 to an optical system utilizing the excitation collection optics 900 and emission collection optics 1000. The optical configuration 1300 comprises, in various forms, a microfluidic channel 1302, a fluid inflow 1304, a GRIN lens/splitter 1306, a channel inlet 1308, a channel outlet 1310, and a micro GRIN lens 1312. Light interacts with fluid within the microfluidic channel 1302, which is typically glass but could be made from polymers such as polydimethylsiloxane.

In configuration A in FIG. 13, the excitation light is provided via excitation optics such as a micro GRIN lens 1312. The emitted light is collected via emission optics such as those illustrated in FIG. 10. In configuration B, the excitation light is delivered via the GRIN lens/splitter 1306, where the splitter is one or more beam splitter. A multiplexed laser-induced OptoOSI interface may be formed from a configuration that cascades configuration B using multiple beam splitters.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. An apparatus comprising:
   a coupling integrating a capillary with a voltage source, a fluid exit port, and a unitary optical manifold; and
   the optical manifold comprising an incident light input, at least one collected light output, and an input for the capillary;
   wherein the capillary enters the input for the capillary and terminates at the fluid exit port;
   wherein the incident light input is a first window in the unitary optical manifold and the at least one collected light output is a second window in the unitary optical manifold; and
   wherein the incident light is injected into the capillary at the first window in the unitary optical manifold and the capillary emits light to emission collection optics via the second window in the unitary optical manifold.

2. The apparatus of claim 1, further comprising a sheath liquid system at least partially enclosing the capillary.

3. The apparatus of claim 1, wherein:
   the fluid exit port comprises a spray emitter; and
   electrospray is driven from the fluid exit port both by a pressure gradient between a liquid reservoir and the spray emitter and by electrokinetic flow produced by an electric potential between a voltage source and the spray emitter.

4. The apparatus of claim 3, the capillary traversing a linear path from the input for the capillary to the spray emitter.

5. The apparatus of claim 1, further comprising:
a reservoir supplying a sheath liquid flow to the capillary in the unitary optical manifold, the reservoir maintained at a ground potential;
a first section of tubing from the reservoir to a junction with a second section of tubing; and
the voltage source applied at the junction.

6. The apparatus of claim 1, further comprising the emission collection optics coupled to the at least one collected light output, the emission collection optics comprising:
at least one micro GRIN lens; and
confocal optics.

7. The apparatus of claim 6, the confocal optics comprising:
at least one collimator; and
at least one doublet achromatic lens bifurcated across an optical aperture.

8. The apparatus of claim 1, the capillary aligned orthogonal to a plurality of collected light outputs of the optical manifold.

9. The apparatus of claim 8, each of the plurality of collected light outputs collecting a different primary color of emitted light from the capillary.

10. The apparatus of claim 8, further comprising a plurality of lasers coupled to the incident light input.

11. The apparatus of claim 3, the spray emitter tapered to 100 um or less at an outlet of the spray emitter.

12. An apparatus comprising:
a unitary optical manifold comprising an incident light input, at least one collected light output, and a capillary linearly traversing the optical manifold from an input for the capillary to a spray emitter;
wherein the incident light input is a first window in the unitary optical manifold and the at least one collected light output is a second window in the unitary optical manifold; and
emission collection optics adjacent to the second window in the unitary optical manifold, the emission collection optics comprising at least one micro GRIN lens.

13. The apparatus of claim 12, further comprising a sheath liquid system at least partially enclosing the capillary.

14. The apparatus of claim 12, wherein the spray emitter comprising a tip tapered coaxially outward at an obtuse angle from an inlet of the spray emitter.

15. The apparatus of claim 14, wherein the tip comprises a greater wall thickness at a joint with the inlet.

16. The apparatus of claim 15, wherein the wall thickness is greater on one side of the tip than on the other.

17. The apparatus of claim 12, comprising:
a reservoir supplying a sheath liquid flow to the capillary in the unitary optical manifold, the reservoir maintained at a ground potential;
a first section of tubing from the reservoir to a junction with a second section of tubing; and
the voltage source applied at the junction.

18. The apparatus of claim 12, the capillary aligned orthogonal to a plurality of collected light outputs of the optical manifold.

19. The apparatus of claim 18, each of the plurality of collected light outputs collecting a different primary color of emitted light from the capillary.

20. The apparatus of claim 3, wherein the spray emitter comprises a tip tapered coaxially outward at an obtuse angle from an inlet of the spray emitter; and
the tip comprises a greater wall thickness at a joint with the inlet.

\* \* \* \* \*